(12) United States Patent
Schumacher et al.

(10) Patent No.: US 6,675,320 B1
(45) Date of Patent: Jan. 6, 2004

(54) METHOD AND DEVICE FOR SYNCHRONIZING AND TESTING A PROCESSOR AND A MONITORING CIRCUIT

(75) Inventors: Hartmut Schumacher, Freiberg (DE); Klaus Ringger, Nuertingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/555,156

(22) PCT Filed: Aug. 7, 1999

(86) PCT No.: PCT/DE99/02470

§ 371 (c)(1),
(2), (4) Date: Jul. 17, 2000

(87) PCT Pub. No.: WO00/20969

PCT Pub. Date: Apr. 13, 2000

(30) Foreign Application Priority Data

Oct. 1, 1998 (DE) .......................... 198 45 220

(51) Int. Cl.[7] .............................................. G06F 11/00
(52) U.S. Cl. .............................. 714/12; 701/36; 701/70; 714/47
(58) Field of Search .................. 714/12, 47, 51, 714/23, 44; 701/36, 45, 39, 42, 48, 70, 76, 92, 97, 33, 29; 713/500, 400

(56) References Cited

U.S. PATENT DOCUMENTS 4,945,486 A * 7/1990 Nitschke et al. ............ 701/114
5,499,336 A    3/1996 Preis et al.
5,522,040 A    5/1996 Angerbauer et al.
5,835,873 A * 11/1998 Darby et al. .................. 701/45
6,009,370 A * 12/1999 Minowa et al. ............. 701/102
6,038,500 A *  3/2000 Weiss ........................... 701/22
6,128,560 A * 10/2000 Ishii ............................. 701/29
6,243,629 B1 * 6/2001 Sugimoto et al. ............. 701/29
6,293,583 B1 * 9/2001 Fujishima et al. .......... 280/735
6,385,743 B1 * 5/2002 Huckfeldt et al. ............. 714/51

FOREIGN PATENT DOCUMENTS

DE    35 39 407 A1    5/1987
DE    40 23 700 A1    1/1992
DE    36 38 947 C2    8/1995

* cited by examiner

Primary Examiner—Scott Baderman
Assistant Examiner—Christopher McCarthy
(74) Attorney, Agent, or Firm—Michael J. Striker

(57) ABSTRACT

The invention relates to a method and apparatus for synchronizing at least one computer, having at least one monitoring circuit associated with this computer. The synchronization takes place through at least one transmitted signal (WDS) in the form of a double pulse from the computer ($\mu C$) to the peripheral components (PIC1, PIC2), which contain the monitoring circuits. To that end, shortly after the computer ($\mu C$) is started up at system start or after an HW reset, the signal (WDS) is sent to the at least one peripheral component (PIC1, PIC2). After this, the upper and lower limit of the signal sequence (WDS) to be regularly transmitted by the computer for the monitoring circuit are tested and therefore the function of the monitoring circuits is tested. As with the synchronization, the testing takes place with a reaction of the monitoring circuits by means of at least one acknowledgement signal (IRS1, IRS2, R).

6 Claims, 3 Drawing Sheets

METHOD AND DEVICE FOR SYNCHRONIZING AND TESTING A PROCESSOR AND A MONITORING CIRCUIT

PRIOR ART

The invention relates to a method and apparatus for synchronizing and checking at least one processor and at least one associated monitoring circuit according to the preambles to the claims.

DE 35 39 407 A1 has disclosed a computer system with two processors in which during normal operation, the computing workload is evenly distributed to the two processors and in the event that one of the processors malfunctions, the other processor switches into a corresponding emergency function. In order to detect malfunctions, each processor is associated with precisely one monitoring circuit. A synchronization of the monitoring circuit with the processor is not provided, nor is the association of a number of monitoring circuits with one processor.

This kind of monitoring circuit, also referred to as a watchdog, is disclosed in many ways in the prior art, e.g. also in DE 40 23 700 A1. In this instance, a watchdog signal that is transmitted by the processor at regular chronological intervals is received in the monitoring circuit. If the frequency of the signal sequence produced from the individual watchdog signals lies outside a particular applicable frequency window, then the watchdog sends a reset signal to the processor on the assumption that an error has occurred. A testing of the watchdog or its synchronization with the processor is thereby not provided, nor is the association of a number of monitoring circuits with one processor.

In contrast, DE 36 38 947 C2 has disclosed a method for synchronizing computers of a multicomputer system and has disclosed a multicomputer system, particularly for safety devices in motor vehicles such as an antilock brake system, seatbelt-tightening systems, or airbags. The multicomputer system is intended for the rapid processing of large quantities of data by distributing them to a number of processors. The computers contain individual timing markers and are connected to one another by means of data and/or control lines. After the starting or resetting of the computers, they each produce a starting signal, which is transmitted to the other computers and is received and evaluated by them. After the arrival of the last starting signal, the timing markers simultaneously begin to generate time markers. As a function of the time markers, the computers generate synchronization signals which are received by the other computers. The received synchronization signals are compared with the own time markers and in the event of a shift, the time marker sequence of the timing marker is changed. Through the exchange of synchronization signals among the processors of the multicomputer system, a reciprocal function monitoring is disclosed by means of which the use of a monitoring circuit is not provided. The simultaneous use of a number of watchdogs per processor and the synchronization of the processors with the associated watchdogs is not disclosed.

With an elimination of multicomputer systems or a direct connection of individual processors for cost reasons or in systems that are self-sufficient for safety reasons, such as control units and peripherals in safety devices of vehicles, in particular an airbag, the monitoring must be carried out by a monitoring circuit.

With a utilization of separate control units or computer peripherals, a number of interface components are connected to a processor, for example application-specific integrated circuits, (so-called ASICs). If these have a monitoring circuit in the standard manner, then a non-operation of this circuit by the processor would lead to errors.

ADVANTAGES OF THE INVENTION

The use of a number of independent watchdogs per processor or per microcontroller on the one hand has the advantage of a level of safety that is higher due to redundancy, on the other hand, standard components can be used to control separate computer or control unit peripherals, e.g. front and side airbags, each by means of a respective ASIC.

In order to be able to use a number of independent watchdogs per microcontroller without malfunction, they must be synchronized. If independent watchdogs are not synchronized, situations can arise in which the system with a microcontroller freezes during the HW reset when the watchdogs trigger a reset or pulse reset in a staggered fashion in such a way that at least one pulse reset comes from at least one watchdog during the startup phase, the power-on reset, of the microcontroller. The method according to the invention assures that this does not occur. In this connection, a synchronization step in so short a time after the power-on reset that no pulse reset of a watchdog in turn triggers a reset, results in the fact that the time bases of the individual ASICs or watchdogs are synchronized and encourages simultaneous starting. Furthermore, through the use of a synchronization, components can be used which have greater component-specific tolerances that have an effect on the respective time base, which permits a cost reduction.

With the use of a single synchronization signal or pulse, this can occur at a time that is valid for the watchdog, by means of which no synchronization is carried out. The preferred use of a double pulse, i.e. two pulses in quick succession, as the synchronization signal sent by the processor for the synchronization has the advantage over the prior art that an incorrect synchronization or the lack of a synchronization is prevented.

DRAWINGS

The invention will be explained in detail below in conjunction with the embodiments shown in the drawings.

DESCRIPTION OF THE EXEMPLARY EMBODIMENTS

Figure 1:
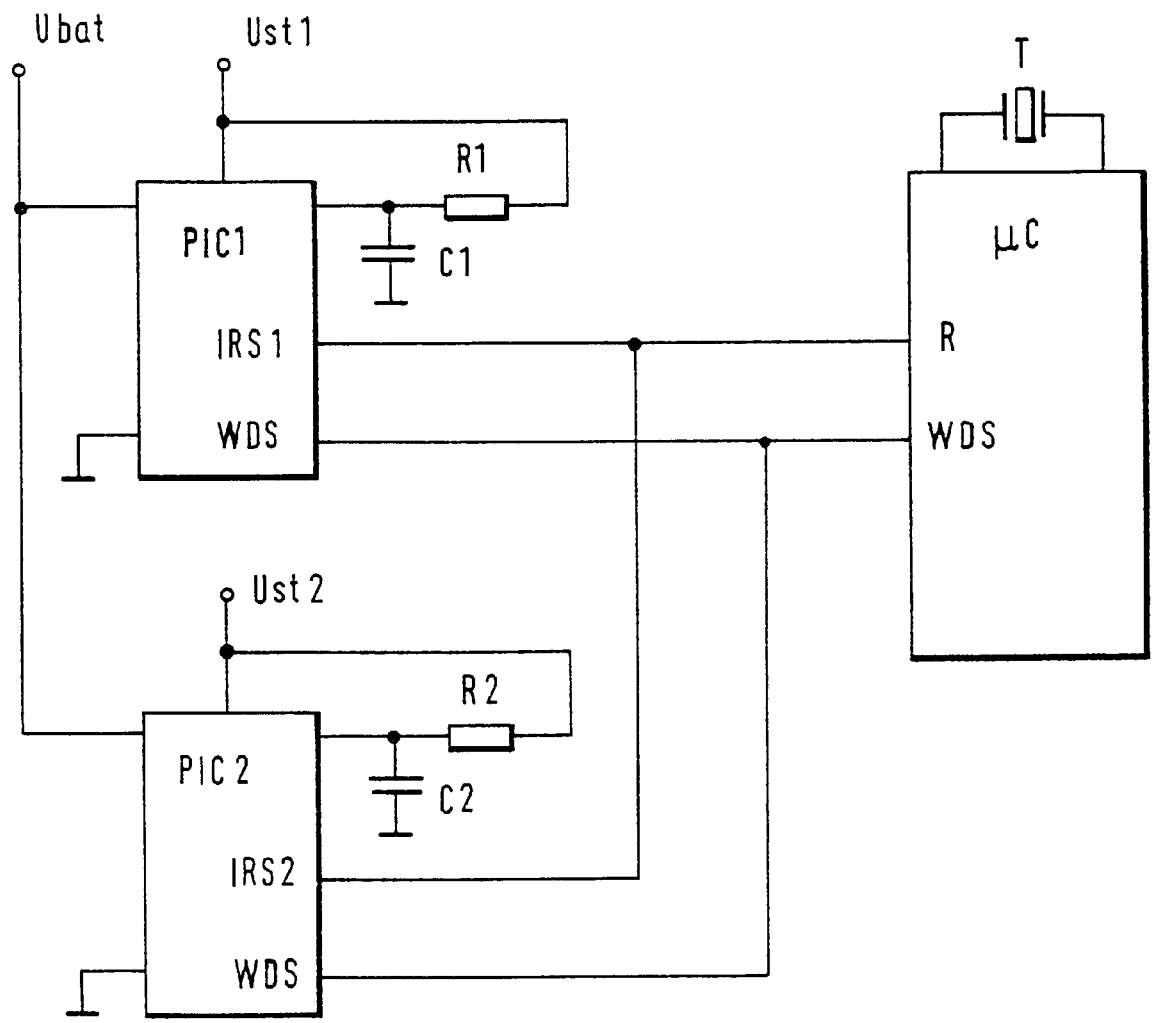
FIG. 1 shows a circuit with one microcontroller and two peripheral components with watchdogs.

FIG. 1 shows a preferred exemplary embodiment of a circuit of a microcontroller $\mu C$ and two peripheral components PIC1 and PIC2, which each contain at least one watchdog circuit The two peripheral components PIC1 and PIC2 are, for example, ASICS in the triggering device for triggering an airbag. In this instance, the entire circuit from FIG. 1 can be integrated into the triggering device. A timing generator for the microcontroller $\mu C$ is labeled T. This can, for F) example, be a vibrating quartz crystal. The two peripheral components PIC1 and PIC2 are connected to the reset input R of the microcontroller $\mu C$ via a reset line. In this particular example, this reset line is designed as a high line. This means that normally, a high signal level is present at the reset Input R of the microcontroller μC and a reduction of this high level to a low signal level, in particular, to ground, triggers a reset. This takes place by means of the signals of the pulse reset outputs IRS1 and IRS2 of the peripheral components PIC1 and PIC2. In this connection, it is sufficient if the signal level if brought to a low level, in particular ground, by means of a pulse reset signal IRS1 and IRS2 in order to bring the reset line to the low signal level and to trigger a reset. Analogously, this can be realized with a low line in which a reset is triggered by means of a signal with a high level. Moreover, PIC1, PIC2, and the μC are connected via the watchdog signal line. Via this line, the microcontroller μC sends a predeterminable watchdog signal WDS to both of the peripheral components PIC1 and PIC2, which is received there at the associated inputs. For the sake of clarity, the signals and their associated signal inputs and outputs in this exemplary embodiment are provided with the same labels. Therefore the output IRS1 of PIC1 emits the pulse reset signal IRS1. The watchdog signal WDS is emitted by the μC and is received equally by PIC1 and PIC2.

Both of the peripheral components PIC1 and PIC2 are powered by the supply voltage Ubat and are respectively powered by the stabilization voltages Ust1 and Ust2. The time base of each peripheral component is produced by the RC elements R1, C1 and R2, C2 shown, which can likewise be integrated into the peripheral components. The resistance R1 is connected to the terminal for Ust1 and the resistance R2 is connected to Ust2. The capacitances C1 at PIC1 and C2 at PIC2 are connected after the resistances and are connected to ground.

Figure 2:
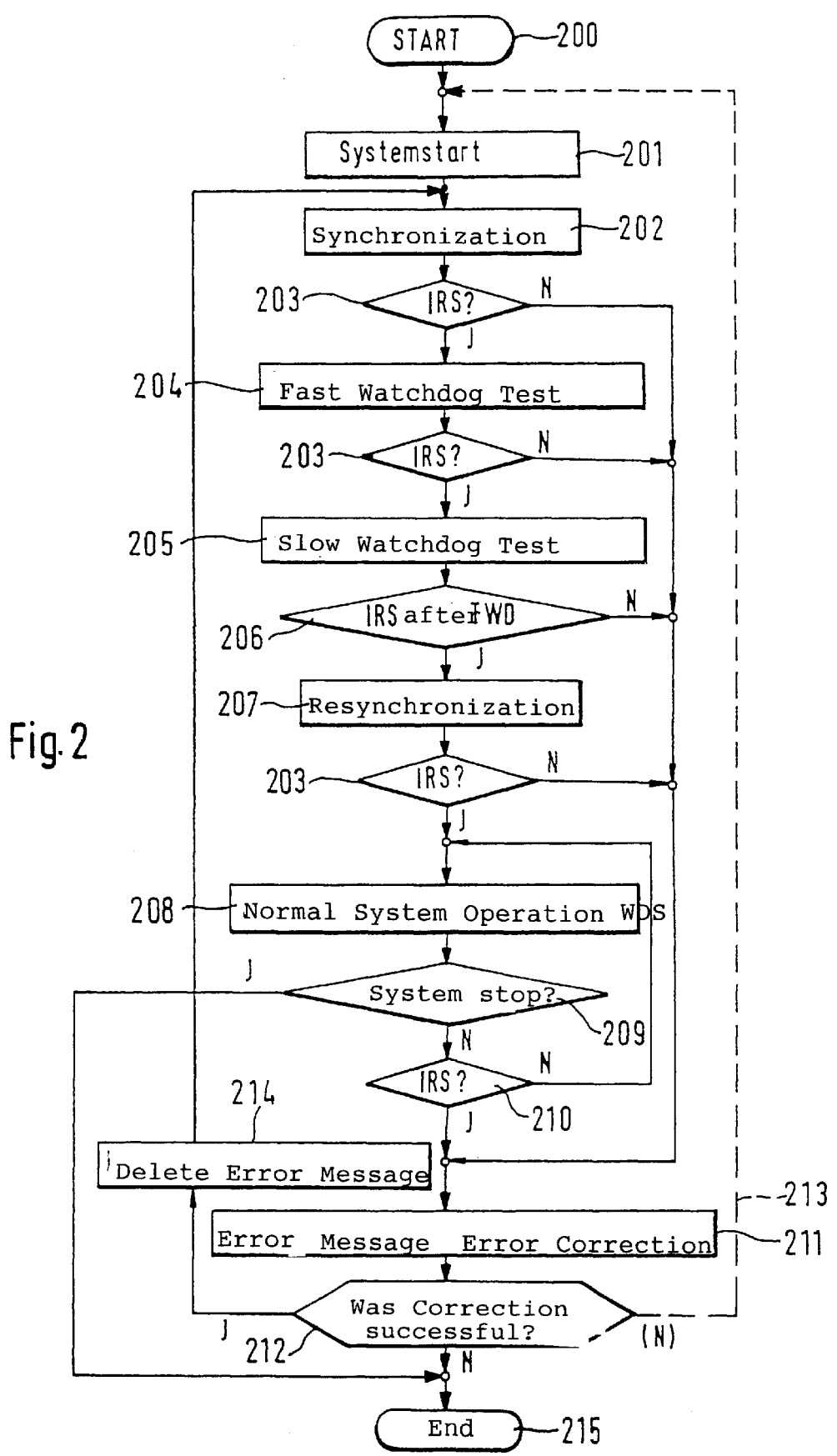
FIG. 2 shows a method for synchronizing and checking the processor and the watchdog in the form of a flowchart.

FIG. 2 shows a process for synchronization of the watchdogs and the microcontroller μC and for function testing of the watchdogs. The start occurs in block 200. For example in a vehicle, this is represented e.g. by the turning of the ignition key. As a result, the system is started up in block 201, i.e. the computer or microcontroller is started. In this starting process, a power-on reset takes place. Only after the system starting time is finished is the high level present in the reset line and therefore in the reset input R of the computer. After the high level is applied to the reset line, a synchronization is executed in block 202. In this connection, the microcontroller SC sends a watchdog signal to the peripheral components PIC1 and PIC2. The preferred use of a watchdog signal as a double pulse comprised of two pulses in quick succession assures that a synchronization takes place even if the first pulse of the WDS is present at a time that is valid for the watchdog in PIC1 and/or PIC2 and as a result, the respective watchdog would not send a pulse-reset. Then the second pulse always occurs at an invalid time and the pulse reset signal IRS is triggered. In this connection, in order to prevent the second pulse of the double pulse from triggering a pulse reset after the first pulse has already triggered one, the spacing of the two pulses of the double pulse is chosen to be smaller than the duration of the pulse reset signal IRS. The pulse reset signal IRS is comprised of the signals of the outputs IRS1 and IRS2, wherein in this exemplary embodiment, the low level of either IRS1 and/or IRS2 is present. In query 203, a test is carried out as to whether the triggered pulse reset IRS occurs. If it does not, then an error message is sent in block 211 and an error correction is attempted. If the pulse reset IRS arrives as expected at the reset input R, then a fast watchdog test is carried out in block 204. This means that before the regular next watchdog signal, preferably a double pulse is in turn emitted by the microcontroller in order to trigger a pulse reset signal IRS, i.e. a pulse reset of at least one watchdog. For the fast watchdog test, the watchdog signal must be sent before the regular chronological interval TWD between two watchdog signals with reference to the synchronization watchdog signal from block 202. If an IRS occurs as expected after this, then a slow watchdog test is carried out in block 205. If not, then the process returns to block 211. In the slow watchdog test in block 205, the watchdog signals are suppressed until the watchdogs in PIC1 and PIC2 output a pulse reset due to the lack of a watchdog signal. The slow and fast watchdog tests are used to test the upper and lower limit of the time interval TWD or of the associated frequency interval. Existing tolerances can likewise be taken into account by means of the predeterminable times of the transmission of the watchdog signals.

Since in the slow watchdog test, two pulse reset signals IRS occur in the interval of the deviation of the two time bases—derived from the respective RC elements—of the independent peripheral components, the peripheral components PIC1 and PIC2 and their watchdogs must be resynchronized. This takes place in block 207. In query 203, the input of the pulse reset signal IRS is checked again. If the answer is no, the process returns to block 211. If the resynchronization was successful, then the normal system operation can begin in block 208, expressed through the transmission of a regular watchdog signal WDS. In block 209, a query is made as to whether the system operation should be stopped. In the normal case, the answer is no and thus in query 210, a check is made as to whether a pulse reset signal IRS has appeared, which in regular operation would indicate an excessively fast or slow watchdog signal and consequently would indicate an error. If no error occurs, then the normal system operation is continued. In the event of an error, i.e. if an IRS is present, then, as in the absence of an IRS in query 203 and 206, the process moves to block 211. There, an error message is transmitted and an error correction is attempted. A test as to whether the correction was successful is carried out in block 212. If this is the case, then the process begins again with a new synchronization and watchdog test starting from block 202 after the deletion of the error message in block 214. If this is not the case, then the process moves to block 215 where the end of the system operation and/or the error message is displayed.

Another variant shows the possibility, after an unsuccessful error correction via 213, of generating a new system start in order to rectify the error.

Another possibility not shown in FIG. 2 would be to continue the system operation in the form of a reduced emergency operation in order to retain necessary functions until it is possible to execute a repair.

Figure 3:
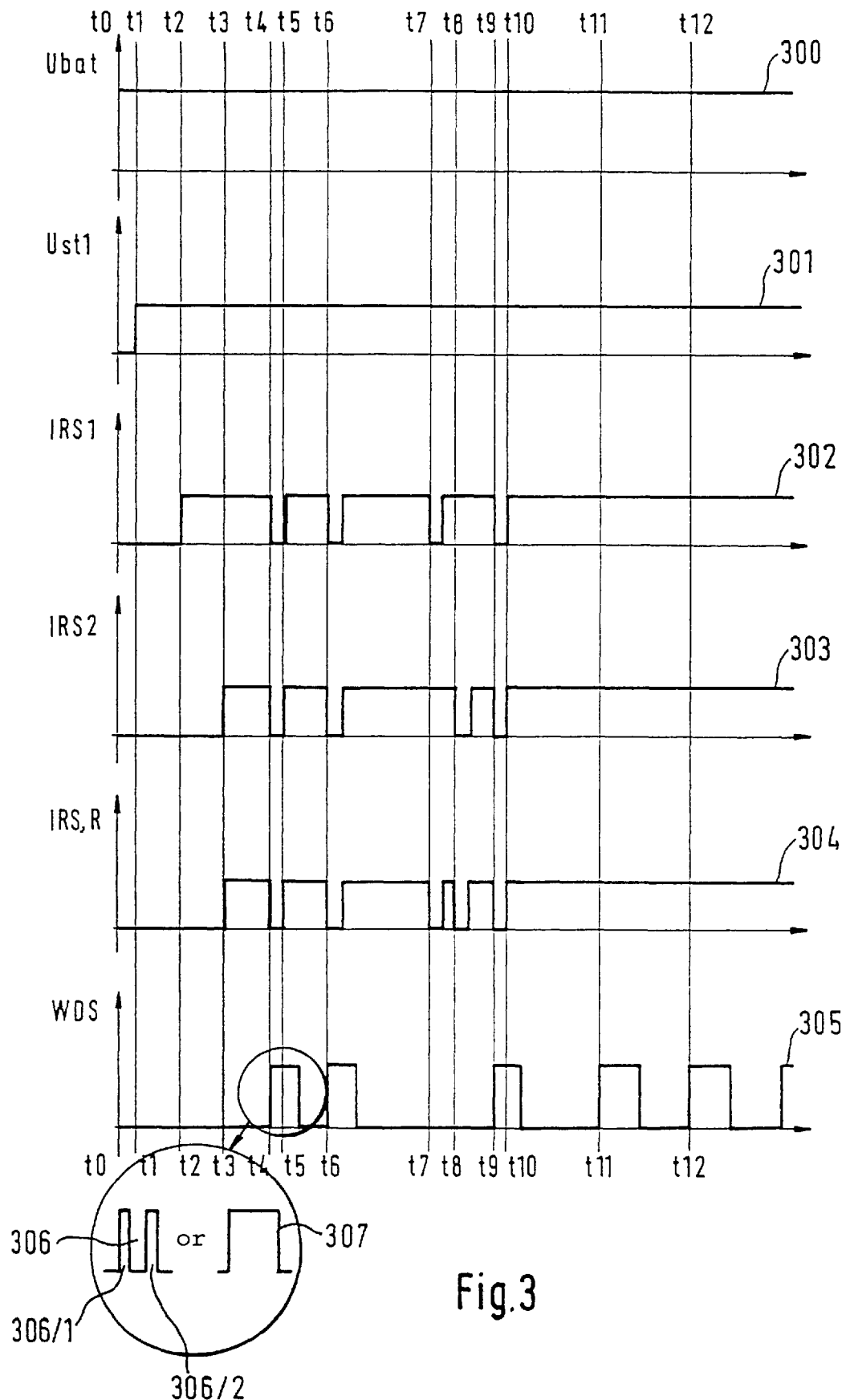
FIG. 3 shows the progression of signals that are essential to the invention.

FIG. 3 schematically depicts the progressions of signals according to the invention. The reference numeral 300 represents the signal progression of the supply voltage Ubat, which is constant over the entire period under consideration. The reference numeral 301 represents the signal progression of the stabilization voltage Ust1. Ust2 would be shown analogously to this. Ust1 and Ust2 are each supplied with current from a separate energy reserve or voltage source per peripheral component, which is powered and charged by the supply voltage Ubat during normal system operation. If the supply voltage fails, then the voltage Ust1 or Ust2 from the respective energy reserve remains available in order to trigger the safety systems of the vehicle. As a result, for example in an airbag system, it is assured that each of the gas cushions (airbags) can still be triggered if the supply voltage, for example, is interrupted due to an accident. A little time passes until t1 before this separate power supply Ust1 or Ust2 becomes constant. Starting at t1, this separate power supply is then constant. With Ust2, the initiating time (t1 with Ust1) can vary slightly in relation to Ust1.

The reference numerals 302 and 303 are used to represent the signal progressions of the pulse reset signals from the respective pulse reset outputs IRS1 and IRS2 of the peripheral components PIC1 and PIC2. The pulse reset signal IRS produced by this at the reset input R is represented in the signal progression 304. Finally, the signal progression 305 represents the watchdog signal supplied by the microcontroller μC, as a sum of the individual signals WDS. When the computer or microcontroller μC is functioning perfectly, the time in which the watchdog expects the watchdog signals WDS (e.g. t12–t11) is labeled TWD, i.e. time watchdog. Depending on the embodiment, there can be a certain tolerance with regard to TWD, which is then taken into consideration.

The high level of IRS1 sets in at t2, whereas the high level in IRS2 and therefore the high level of the total pulse reset signal IRS present at the reset input R first occurs at t3. This time lag t3–t2 is based on the fact that the power-on time, i.e. the time that is required to start up the system, is derived from the time between two regular watchdog signals TWD, e.g. t12–t11. This occurs, for example, by means of a factor with which the time TWD is acted upon in order to predetermine the power-on time. The tolerances of the time TWD, which are likewise acted upon with the factor, result in the time delay t3–t2 of both IRS1 and IRS2 at the system start. If the pulse reset, i.e. the low level on the high level line of the one watchdog, follows the pulse reset of the other watchdog by the time delay of t3–t2 and the time bases of the two, derived from the respective RC elements, are similar, then the system start is stopped in the HW reset. In order to prevent this, the first watchdog signal which corresponds to the synchronization step in block 202 is sent very rapidly (t4) after the power-on reset. The time t4–t2 is thereby selected or predetermined to be shorter than the regular watchdog time TWD (e.g. t12–t11) in order, despite the time delay, to generate the synchronized pulse reset IRS at t4 (IRS1 and IRS2 and IRS at low level). The depiction in FIG. 3 shows that the synchronization signals (at t4 and t9) and the test signal (t6) can be embodied either as a normal pulse 307 or preferably as a double pulse 306. Since the above-mentioned signals (at t4, t6, t9) should trigger a synchronized pulse reset IRS, the second pulse 306/2 of the double pulse 306 assures that this pulse reset IRS would also be triggered if the first pulse 306/1 of the double pulse 306 were to arrive at a time that was valid for the watchdog(s) and as a result, no IRS were to be triggered. However, in order to prevent the second pulse 306/2 from triggering a pulse reset IRS despite the fact that the first pulse 306/1 has already triggered a pulse reset IRS, the distance of the second pulse 306/2 from the first pulse 306/1 must be chosen so that the pulse reset IRS triggered by the first pulse 306/1-e.g. at t4–is still happening when the second pulse 306/2 occurs. In this example, the pulse spacing of the double pulse 306 should be selected or predetermined to be shorter than the duration t5–t4 of one pulse reset signal IRS. After the synchronization at t4, the fast watchdog. test is executed at t6. Before the end of the watchdog time TWD, a pulse reset IRS (t6) is in turn triggered while taking into account its possible tolerance.

The slow watchdog test is executed through the suppression or non-transmission of watchdog signals WDS. As a result, for both watchdogs, the time expires within which a watchdog signal WDS would regularly have to arrive and PIC1 with IRS1 at time t7 as well as PIC2 with IRS2 at time t8 trigger a pulse reset IRS at the reset input R of the microcontroller μC. The two peripheral components PIC1 and PIC2 and their watchdogs diverge from each other by t8–t7 due to their generally differing bases. Therefore the two peripheral components PIC1 and PIC2 and their watchdogs are synchronized again in t9 before the beginning of the normal system operation. If a double pulse 306 is selected, then the first regular watchdog signal WDS is sent after the end of the watchdog time TWD (e.g. t12–t11) after the resynchronization and the second pulse 306/2 in t10. Due to the rapid sequence of the pulses 306/1 and 306/2 in the double pulse 306, however, this time span t10–t9 or t5 t4 usually lies within the tolerance of the watchdog time TWD.

The exemplary embodiments shown in the drawings with the FIGS. 1–3 can be arbitrarily broadened to more than one microcontroller or processor and to more than two watchdogs respectively associated with these.

The synchronization and/or testing (watchdog test) can advantageously also be used with only one independent watchdog and one or more microcontrollers or processors.

In this connection, synchronization is understood in the very general sense to be the bringing into agreement of the starting times for the time span in the at least one monitoring circuit and the at least one processor or computer. Advantageously, this can take place by means of at least one synchronization signal, in particular a double pulse, from the at least one processor to the at least one monitoring circuit.

What is claimed is:

1. A method for operating at least one computer and at least one monitoring circuit associated with the at least one computer for safety devices in vehicles, wherein the at least one computer and the at least one monitoring circuit exchange at least one signal, whereby the at least one computer and the at least one monitoring circuit are synchronized by means of the at least one signal, characterized In that the at least one signal is embodied as a pulse sequence of at least two separate pulses, wherein the spacing of the two pulses is chosen to be smaller than the duration of a pulse reset signal from the at least one monitoring circuit.

2. The method according to claim 1, characterized in that after the at least one computer and the at least one monitoring circuit have been synchronized, the monitoring circuit is tested as to its function, wherein by means of the transmission or non-transmission of at least one test signal by the at least one computer, a reaction caused by this in the form of at least one reset signal, of the at least one monitoring circuit, is tested.

3. The method according to claim 2, characterized in that the at least one signal by means of which the at least one computer and the at least one monitoring circuit are synchronized and/or the at least one test signal are embodied as a pulse sequence of at least two separate pulses.

4. An apparatus with at least one computer and at least one monitoring circuit associated with the at least one computer for safety devices in vehicles, wherein the at least one computer and the at least one monitoring circuit exchange at least one signal, whereby the at least one computer and the at least one monitoring circuit are synchronized by means of the at least one signal characterized in that the at least signal is embodied as a pulse sequence of at least two separate pulses, wherein the spacing of the two pulses is chosen to be smaller than the duration of a pulse reset signal from the at least one monitoring circuit.

5. An apparatus with at least one computer and at least one monitoring circuit associated with the at least one computer for safety devices in vehicles, wherein the at least one computer and the at least one monitoring circuit exchange at least one signal, whereby the at least one computer and the at least one monitoring circuit are synchronized by means of the at least one signal characterized in that the at least one computer is associated with at least two independent monitoring circuits, and the at least one signal is embodied as a pulse sequence of at least two separate pulses, wherein the spacing of the two pulses is chosen to be smaller than the duration of a pulse reset signal from the at least one monitoring circuit.

6. The apparatus according to claim 5, characterized in that the at least one computer and the at least two monitoring circuits associated with it are synchronized by means of the at least one signal.

* * * * *